July 29, 1947.  K. F. NYSTROM ET AL  2,424,625
RAILWAY CAR TRUCK SPRING MOUNTING
Filed July 13, 1945  2 Sheets-Sheet 1

INVENTORS.
Karl F. Nystrom.
BY Vernon L. Green.

July 29, 1947. K. F. NYSTROM ET AL 2,424,625
RAILWAY CAR TRUCK SPRING MOUNTING
Filed July 13, 1945 2 Sheets-Sheet 2

INVENTORS.
Karl F. Nystrom,
BY Vernon L. Green,
ATTY.

Patented July 29, 1947

2,424,625

UNITED STATES PATENT OFFICE 2,424,625

RAILWAY CAR TRUCK SPRING MOUNTING

Karl F. Nystrom, Nashotah, and Vernon L. Green, Milwaukee, Wis.

Application July 13, 1945, Serial No. 604,775

7 Claims. (Cl. 105—197)

1

Our invention relates to railway car trucks more especially intended for passenger cars and has for its object the provision of coil spring holding containers correlated with spring receiving pockets adjacent the ends of the truck bolster and the bolster yieldably supported in place.

The invention involves the use of spring receiving containers which are supported from the truck transom members by suitable pins located in the pin-holes as employed in existing truck structures having spring planks swingably supported by swing hangers with cross-bars; thus adapting our invention to present day passenger trucks.

Our invention contemplates the provision of spring holding containers having vertically adjustable or movable bottoms supported by cross bars or keys of preselected vertical dimensions removably seated in slotted brackets depending from the sides of the containers whereby the riding height of the bolster supporting springs may be regulated and such regulation accomplished by simply jacking up or raising the movable container-bottom instead of jacking up an entire spring plank in order to release it from its supporting bars and then lowering the plank to release the springs, an operation which generally must be repeated a number of times for the purpose of ascertaining the correct thickness of shim to be employed—a procedure which upsets the equilibrium of the car.

The aforementioned objects of the invention and its advantages will all be more readily comprehended from the detailed description of the accompanying drawing wherein—

It will be understood, of course, that the truck includes the usual wheeled axles provided with journal boxes or bearing housings and truck springs, but as these elements are in no way associated with our invention, illustration of said elements is not deemed necessary.

Figure 1:
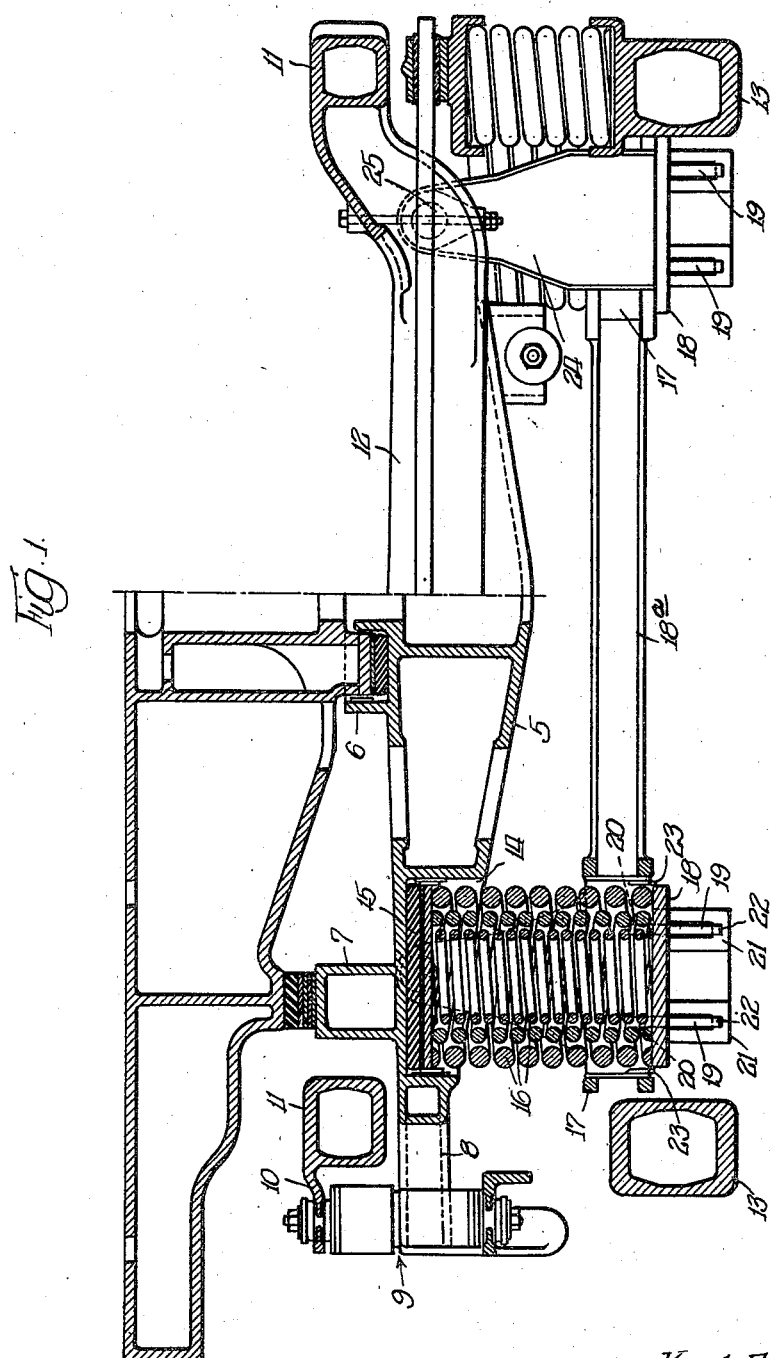
Figure 1 is a transverse sectional view of a truck frame, truck bolster and our improved spring supporting means, with a portion of the truck transom and our improved means at one side of the figure shown in elevation.
Figure 2:
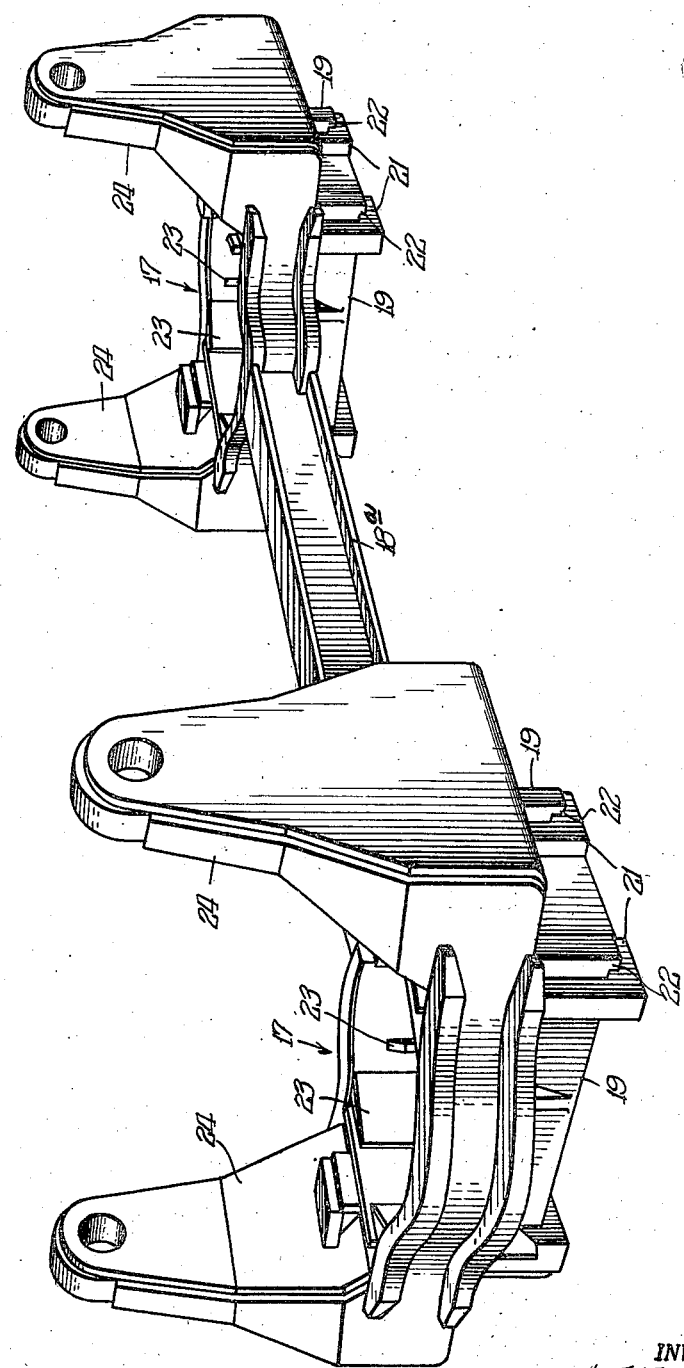
Figure 2 is a perspective view of the spring basket assembly or unit with the springs omitted.

One end of the truck bolster, in longitudinal section, is shown at 5, with a portion of the center bearing shown at 6 and a side bearing, in section, shown at 7. The end of the bolster is shown with an extension 8 for attachment of a suitable shock absorbing device 9 whose upper end is attached to a bracket 10 formed integral with the side frame 11; the side frames at opposite sides of the truck being secured together by the usual transom members, a portion of one being shown in elevation at 12. Figure 1 illustrates a truck with equalizer members shown in cross section at 13, 13, but it will be understood that our invention is adapted for use with trucks whose side members or wheel pieces are connected together by the usual transversely disposed and spaced apart transom members between which the truck bolster is yieldably supported; the transom members generally merging into and made integral with the side frame members.

The bolster 5, adjacent its ends and on its lower face, is provided with downwardly opening spring receiving pockets 14, which preferably are provided with suitable cushion elements as at 15, on which the upper ends of the coil springs 16 seat.

The lower ends or coils of each group of coil springs 16 (a group being arranged adjacent each end of the bolster 5) are surrounded by an open ended container 17, of suitable internal form; and the holders 17 at opposite sides of the truck are connected by a rigid bar 18$^a$, so as to cause uniform lateral movement of the containers or holders.

The lower ends of the springs 16 seat on the removable and vertically adjustable spring seat members or bottoms 18, which are supported by the transversely disposed keys or cross bars 19, 19, whose ends pass through elongated vertical slots 20 arranged in the opposite sides of the holders 17 and in the depending extensions or brackets 21 preferably formed integral with the side walls of the shells.

In order to prevent displacement or longitudinal movement of the keys 19, 19, the ends of the latter preferably are provided with depending lips at 22, adapted to overlap the lower perimeters of the vertical slots 20 on the outer faces of the extensions or brackets 21.

Suitable means for positioning or centering the lower coils of springs 16 to prevent contact of the springs with the upper ends of the holders 17 preferably are employed, as for example, by providing opposite side walls of the containers with the vertically disposed guides 23 arranged at opposite ends and sides of the holders or containers.

The holders 17, at opposite sides, are each provided with a pair of apertured arms or upwardly disposed extensions 24, adapted to extend into the spaced transom members provided with downwardly opening sockets. The opposite side walls of each transom member and the upper ends of the holder extensions or arms 24 are apertured to receive the transversely disposed pins 25 whereby the holders 17 are pendently supported in place from the spaced apart transom members.

The keys or bars 19 are of preselected vertical width to maintain the spring seat members 18 at the desired elevation; that is to say, when it is desired to raise the springs, keys of greater vertical width are inserted through the slots of the depending extensions or brackets at opposite sides of the holders, thereby forcing the spring seat members 18 upwardly; or by employing keys or cross bars of lesser vertical width, the spring seat members and springs will be lowered.

Instead of jacking up a spring plank as heretofore employed for adjusting the height of the springs, thereby upsetting the equilibrium of the car, it is merely necessary to place a jack beneath the loosely mounted spring seat member 18, raising the latter just sufficiently to release the cross bars or keys and their depending lips in the vertical slots of the holder extensions or brackets 21, and replacing the cross bars or keys with keys of different vertical width to maintain the spring seat members 18 at the desired elevation; an operation which may be accomplished without disturbing the pivots of the pendently supported holders and the equilibrium of the car.

The advantages and simplicity of our improved structure are readily apparent, both in installation and in spring and bolster adjustment; the invention being readily adapted to present day truck construction, by simply removing the usual spring plank, the swing hangers and plank supporting bars and then inserting the upper ends of the holder arms or extensions in the swing hanger receiving sockets of the transom members and replacing the pins in the same pin receiving holes in the sides of the transom members. The groups of springs may then be inserted through the lower ends of the holders and held in place by the seat members 18 supported by the keys 19. Our improved structure permits the use of springs of greater height than is the case with present day structures; while at the same time providing a structure which prevents lateral shifting or displacement of the lower ends of the respective springs.

We have shown what we believe to be a simple embodiment of the invention, which has been described in terms of description and not as terms of limitation, as structural modifications may be possible without, however, departing from the spirit of our invention as defined in the appended claims.

What we claim is:

1. In a railway car truck, a frame provided with a pair of parallelly arranged spaced transom members; a bolster arranged between the transom members and provided adjacent its ends and on its lower face with downwardly facing spring receiving sockets; a pair of open ended vertically disposed holders pendently secured adjacent the ends of the transom members and provided at their lower ends with vertically slotted depending extensions; coil springs arranged in said holders with their upper ends seated in said bolster sockets; a spring-seat member for the lower ends of the springs movable vertically at the lower end of each holder and between the depending extensions thereof; and cross-bars of preselected vertical width arranged transversely beneath the spring-seat members with their ends disposed through the slots of the holder extensions.

2. In a railway car truck provided with spaced apart transom members provided with vertical slots and pin receiving holes, a spring holding unit comprising a pair of spaced spring receiving holders with upwardly disposed apertured arms at opposite sides of the holders adapted to be pivotally secured in the slots of the transom members and slotted extensions at the bottoms, means whereby the holders are rigidly connected together, each holder having a movable bottom, and removable key members of preselected vertical width adapted to be inserted through the slots of said extensions for supporting the bottoms in place.

3. In a railway car truck provided with spaced transom members, a bolster spring holding unit composed of a pair of spring receiving holders with movable bottoms and depending vertically slotted extensions, the inner side walls of the containers having spring centering elements and opposite ends of the holders having upwardly disposed apertured arms adapted to be pivotally secured to the transom members; a connecting member secured to the sides of the holders for maintaining the spaced relation between the holders; and removable keys of preselected dimensions insertible through the slotted extensions of each holder for supporting the bottoms in place.

4. In a railway car truck, a frame provided with parallelly arranged spaced transom members; a bolster arranged between the transom members; a pair of vertical holders pendently secured to the transom members and disposed beneath the bolster; said holders having vertically adjustable spring-seat members; means whereby said spring-seat members are maintained at the desired elevation; means whereby said holders are tied together to move in unison; and bolster supporting springs arranged in said holders on said spring-seat members with their upper ends in supporting relation with the bolster.

5. In a railway car truck, a frame with parallelly arranged spaced transom members; a bolster arranged between the transom members; vertical holders pendently secured to the transom members in spaced relation beneath the bolster and provided with movable bottoms and with vertical slots in opposite sides; removable bars of preselected dimensions slidable in said holder-slots transversely beneath the bottoms whereby the latter are supported at the desired elevation; and coil springs arranged in said holders on said bottoms with their upper ends in supporting relation with the bolster.

6. In a railway car truck, a frame provided with a pair of parallelly arranged spaced transom members with downwardly opening sockets adjacent their ends; a bolster, arranged between the transom members, provided adjacent its ends and on its lower side with spring holding surfaces; a bolster spring holding unit disposed transversely of the truck beneath the bolster, provided at the ends with spring receiving pockets having rigid upstanding arms adapted to be pendently secured in said transom sockets, the pockets of said unit being provided with vertically adjustable spring-seat members; means removably mounted at the bottoms of said pockets whereby said spring seat members are held at a preselected elevation; and bolster supporting coil springs arranged in the pockets with their upper ends arranged on said bolster surfaces.

7. In a railway car truck, a truck frame provided with a pair of spaced transom members; a truck bolster arranged between the transom members; a spring holding unit, disposed transversely of the truck beneath the bolster, consisting of a pair of receptacles open at top and bottom to permit spring insertion through the bottom and having upstanding rigid arms at opposite ends whereby the receptacles are pendently secured to the transom members, the ends of the receptacles having depending vertically slotted extensions; removable bottoms in said receptacles; and removable keys of preselected vertical width slidable in the extension slots and adapted to effect interengaging relation with said extensions, said keys being adapted to support the bottoms at the desired elevations in the receptacles.

KARL F. NYSTROM.
VERNON L. GREEN.

REFERENCES CITED

The following references are of record in the file of this patent:

UNITED STATES PATENTS

| Number  | Name   | Date          |
|---------|--------|---------------|
| 800,921 | Kiesel | Oct. 3, 1905  |
| 471,644 | King   | Mar. 29, 1892 |